US011664898B2

(12) United States Patent
Maleki et al.

(10) Patent No.: US 11,664,898 B2
(45) Date of Patent: May 30, 2023

(54) PHOTONIC PROCESSING OF RF SIGNALS USING POLYCHROMATIC COHERENT OPTICAL SOURCE

(71) Applicant: OEWAVES, INC., Pasadena, CA (US)

(72) Inventors: Lute Maleki, Pasadena, CA (US); Andrey B. Matsko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 116 days.

(21) Appl. No.: 17/328,805

(22) Filed: May 24, 2021

(65) Prior Publication Data

US 2022/0021454 A1    Jan. 20, 2022

Related U.S. Application Data

(60) Provisional application No. 63/052,294, filed on Jul. 15, 2020.

(51) Int. Cl.
*H04B 10/60* (2013.01)
*H04B 10/2575* (2013.01)
*G02B 6/293* (2006.01)

(52) U.S. Cl.
CPC ..... *H04B 10/2575* (2013.01); *G02B 6/29341* (2013.01); *H04B 10/60* (2013.01)

(58) Field of Classification Search
CPC .... H04B 10/00; H04B 10/60; G02B 6/29341; G02B 6/43
See application file for complete search history.

(56) References Cited

U.S. PATENT DOCUMENTS

| | | | | |
|---|---|---|---|---|
| 5,710,651 A | * | 1/1998 | Logan, Jr. | H04B 10/25758 398/201 |
| 8,718,490 B2 | * | 5/2014 | Xu | H04L 27/2647 398/205 |
| 8,761,603 B1 | | 6/2014 | Maleki | |
| 8,768,180 B2 | * | 7/2014 | Westlund | H04B 10/60 398/202 |
| 2008/0075464 A1 | | 3/2008 | Maleki et al. | |

(Continued)

OTHER PUBLICATIONS

International Search Report and Written Opinion—PCT/US2021/041642—ISA/EPO—dated Jan. 10, 2022.

*Primary Examiner* — Tanya T Motsinger
(74) *Attorney, Agent, or Firm* — Loza & Loza, LLP; Daniel Mallery (57) ABSTRACT

A photonic system enabling the processing of high frequency microwave, mm-wave, THz signals or other RF signals. The processing may include, e.g., adjusting the frequency, quadrature, and/or power of the signals. In illustrative examples, the system uses a polychromatic light source producing at least two low noise optical emission frequencies that can be independently tuned in a broad frequency range and/or modulated in a broad frequency range using external modulators. An RF input signal is upconverted to one of the optical harmonics of the modulated polychromatic source, processed in the optical frequency domain, and downconverted to the RF domain (at the same or a different RF carrier frequency). The photonic system can be integrated on a planar optical substrate, such as a photonic integrated circuit (PIC). Optical local oscillators are also described for use in the photonic system or for other purposes. Various system, device, and method examples are provided.

13 Claims, 7 Drawing Sheets

(56) References Cited

U.S. PATENT DOCUMENTS

| | | | |
|---|---|---|---|
| 2011/0028146 A1* | 2/2011 | Tammisetti | H04W 28/0236 |
| | | | 455/445 |
| 2017/0115333 A1* | 4/2017 | Radic | G01R 23/20 |
| 2017/0141844 A1* | 5/2017 | Sakamoto | G01J 1/44 |
| 2019/0028203 A1* | 1/2019 | Kuse | H04J 14/02 |
| 2020/0382217 A1* | 12/2020 | Younce | H04B 10/614 |
| 2020/0409229 A1* | 12/2020 | Morton | G02F 1/212 |
| 2022/0013903 A1* | 1/2022 | Evans | H01Q 3/34 |

* cited by examiner

PHOTONIC PROCESSING OF RF SIGNALS USING POLYCHROMATIC COHERENT OPTICAL SOURCE

CROSS-REFERENCE TO RELATED APPLICATIONS

This application claims priority based on U.S. Provisional Patent Application Ser. No. 63/052,294, filed Jul. 15, 2020, for "PHOTONIC PROCESSING OF RF SIGNALS USING POLYCHROMATIC COHERENT OPTICAL SOURCE," which is assigned to the assignee hereof and incorporated by reference herein in its entirety.

FIELD OF THE DISCLOSURE

Various aspects of the disclosure relate to photonic systems.

BACKGROUND

RF photonics allows for increasing the bandwidth of signal processing to 100s of gigahertz (GHz), where, herein, RF includes radio frequency, microwave, millimeter (mm) wave, and sub-terahertz (THz). One issue is that RF photonic devices are relatively large and bulky since the devices incorporate large components, such as lasers, modulators and spectrum shapers. In addition, RF photonic local oscillators (LOs) may be required for downconversion of signals to lower frequencies to support the electronic signal processing. Such downconversion and electronic signal processing calls for broadband electronic mixers and amplifiers and specialized filters that are either unavailable or inefficient.

It is noted that RF LO signals can be generated using mode locked lasers as well as tunable continuous wave (CW) lasers. Systems involving mode locked lasers often can be bulky and environmentally sensitive. The CW lasers can be compact, but the performance of such compact lasers is often not sufficiently low noise for practical applications. A photonics-based generation of RF LO designed to use a CW laser may include a laser beam consisting of two or more coherent longitudinal modes with frequency spacing equal to a desired RF frequency. As the longitudinal modes beat with each other in the photodiode, a RF (e.g., millimeter (mm) wave/microwave/radio frequency) signal is generated. A change in the relative frequency of the lasers results in a change in the frequency of the RF signal. A change in the power of the lasers results in a change in the power of the RF signals. Such a device or method can have several disadvantages. For example, since the two longitudinal modes generated by a dual-mode laser or by two separate lasers have low coherency, the RF generated by their beating may have poor spectral purity. Stabilization of the lasers calls for bulky optical cavities. In addition, lasers typically cannot be tuned fast enough. Since the efficiency of Broadband photodiodes usually degrades with frequency, so the use of high frequency photodiodes represents reduced efficiency and added cost.

A new approach is needed to solve these and other problems.

SUMMARY

In one aspect, a photonic system is provided that includes: an optical source configured to provide first and second optical signals with mutual coherence; an electro-optical modulator configured to convert an input RF signal to an intermediate optical signal using the first optical signal; an optical filter configured to controllably adjust a spectrum of the intermediate optical signal to produce an adjusted intermediate optical signal; and a photomixer configured to convert the adjusted intermediate optical signal to an output electrical signal using the second optical signal. The photonic system may be used, for example, to upconvert or downconvert an input RF signal at an input frequency to another frequency, such as an intermediate frequency (IF) or a baseband frequency.

In another aspect, a method for processing signals using a photonic device is provided. The method includes: generating first and second optical signals with mutual coherence using an optical source; converting an input RF signal into an intermediate optical signal by applying the input RF signal and the first optical signal to an electro-optical mixer configured to modulate the first optical signals using the RF signal; adjusting a spectrum of the intermediate optical signal using an optical filter to generate an adjusted intermediate optical signal; and converting the adjusted intermediate optical signal into an output electrical signal using a photomixer that also receives the second optical signal. The method may be used, for example, to upconvert or downconvert an input RF signal at an input frequency to another frequency, such as an IF or a baseband frequency.

In yet another aspect, a photonic device is provided that includes: a first injection-lock laser coupled to a first resonator that is configured to output a first laser signal along a first optical path; a second injection-lock laser coupled to a second resonator that is configured to output a second laser signal along a second optical path; a controller configured to provide a control signal for controlling both the first and the second injection-lock lasers to control both the first and second laser signals; a first converter configured to convert a portion of the first laser signal to a first electrical control signal for feeding back to the controller; a second converter configured to convert a portion of the second laser signal to a second electrical control signal for output; a first optical coupler configured to couple a portion of the first laser signal onto the first optical path between the second resonator and the second converter; and a second optical coupler configured to couple a portion of the second laser signal onto the second optical path between the first resonator and the first photo-converter. The photonic device may be used, for example, as a local oscillator.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure. In the figures, elements may each have a same reference number or a different reference number to suggest that the elements represented could be different and/or similar. However, an element may be flexible enough to have different implementations and work with some or all of the systems shown or described herein. The various elements shown in the figures may be the same or different and, which one is referred to as a first element and which is called a second element is arbitrary.

Overview

Modern analog data systems, such as communication system receiver front ends and radar systems, are growing in frequency of operation. For example, the need for increased data rates dictates increasing the frequency of the carrier to microwave, millimeter (mm)-wave, and sub-THz range. In the case of radar, increasing the carrier frequency may be required when certain atmospheric dynamics are being investigated, or when directionality of the radar beam is important.

The high frequency of operation in turn may require stages of up or down conversion of the frequency of the signal. The drivers that may be used for this function include: 1) high performance electronic references or local oscillators (LO) that typically operate at a few MHz to 10 GHz; with 2) digital processing of the signal performed at a "baseband" frequency, requiring the RF signal to be downconverted in frequency. The up/down conversion process in traditional electronic systems is achieved through stages of mixing of the RF signal to stages of LO to up/down convert to possibly several stages of intermediate frequencies (IF), before producing the baseband signal.

Lightwave transmission of signal can provide a significant benefit in signal transmission systems because of the low loss of optical waveguides and the availability of high bandwidth modulators. Based on this, various proposals have been made for realization of up/down conversion function with assistance from photonic components. In some schemes, the RF signal and an RF LO are modulated separately on an optical carrier produced by a single laser resulting in a downconverted signal when the signal and LO beat on a photodetector, which functions as an optical mixer. This architecture can simplify the up/down conversion system but may still require an RF LO and electronic mixers and filters and may be difficult to implement with wideband tunability. Perhaps more importantly, the mixed architecture including both electronic and photonic parts is not currently practical for photonic on-chip integration.

Note that processing high frequency (e.g., V, W, and G, and higher frequency bands) signals is currently practical in only a relatively narrow frequency range due to the unavailability of suitable broadband electronic amplifiers, analog/digital (A/D) converters, narrowband broadly tunable microwave filters, as well as spectrally pure local oscillators (LOs). High performance electronic references or LOs typically operate at a few MHz to a few GHz. Digital processing of the signal is performed at a "baseband" frequency that can require the RF signal to be downconverted in frequency. The up/down frequency conversion process in traditional electronic systems is achieved through stages of mixing of the radio-frequency (RF) signal to stages of the LO to downconvert to (possibly) several stages of intermediate frequencies (IF) before producing the baseband signal. This process can be power inefficient, bulky, and expensive.

RF LO signals can be generated using mode locked lasers as well as tunable continuous wave (CW) lasers. Systems involving mode locked lasers usually can be bulky and environmentally sensitive. A photonics-based LO designed to use a CW laser may include a laser beam consisting of two or more coherent longitudinal modes with frequency spacing equal to a desired RF frequency. As the longitudinal modes beat with each other in the photodiode, a required mm-wave/microwave or other RF signal is generated. A change in the relative frequency of the lasers results in a change in the frequency of the RF signal. A change in the power of the lasers results in a change in the power of the generated RF signals. Such a device or method can have several disadvantages. Since the two longitudinal modes generated by a dual-mode laser or two separate lasers have low coherency, the RF generated by their beating may have poor spectral purity. Stabilization of the lasers may require bulky optical cavities. In addition, lasers typically cannot be tuned fast enough. Also, the efficiency of Broadband photodiodes usually degrades with frequency, so the use of high frequency photodiodes represents reduced efficiency and added cost.

For electronic systems providing "tunability" of frequency conversion to support more than a single carrier frequency, such systems can become even more complex. A simpler system providing tunability is provided herein.

Exemplary Photonic System, Devices, and Methods

Figure 1:
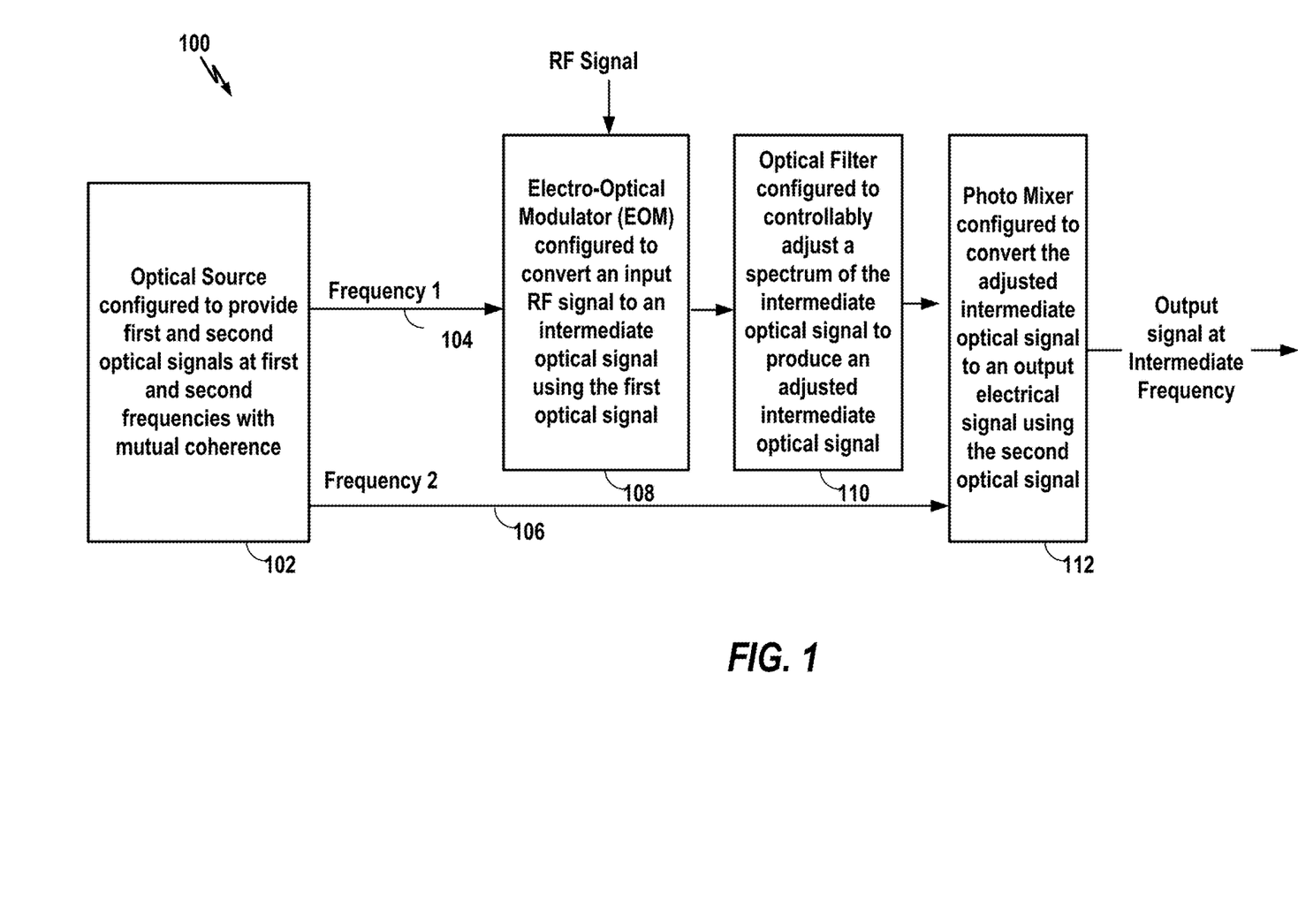
FIG. 1 illustrates a photonic device for converting an RF signal to an intermediate frequency (IF) signal (or other desired output signal).

FIG. 1 illustrates a photonic device 100 for upconverting (or downconverting) an RF signal to an IF signal using a pair of optical signals. The photonic device 100 has an architecture that combines production of the LO and the up/down conversion stage, allowing integration of the entire system (LO and up/down converter) on a single photonic integrated circuit (PIC). The photonic device 100 includes an optical source 102 configured to output a first frequency optical signal 104 and a second frequency optical signal 106 that are mutually coherent, e.g., the optical source may be a tunable dichromatic source (such as two lasers, an opto-electronic oscillator, or an optical parametric oscillator). The first frequency optical signal 104, which may be a carrier signal, is fed into an electro-optical modulator (EOM) 108, which also receives an input RF (e.g. microwave) signal. The RF input signal may be, for example, a data transmission signal encoded using quadrature amplitude modulation (QAM), such as a 256-QAM signal. In some examples, the EOM may be a plasmonic electro-optical modulator or an electro-optic parametric converter.

The EOM 108 modulates the first frequency optical signal 104 using the RF signal and the output of the EOM 108 is fed as an intermediate optical signal into an optical filter 110 and then into a first input of a photomixer 114, such as a photodetector (PD) or photodiode, a nonlinear electro-optical crystalline converter, or a plasmonic converter. As will be explained in greater detail below, the output of the EOM 108 may include various sidebands of the first frequency carrier signal and the optical filter 110 may be configured to select one of the sidebands. More generally, the optical filter 110 is configured to controllably adjust a spectrum of the intermediate optical signal. In some examples, the optical filter may include a frequency selective phase shifter or a frequency selective delay line.

The photomixer 112 also receives the second frequency optical signal 106, which may have the same frequency as the first frequency optical signal or have a frequency that differs by a desired amount from the first frequency optical signal. The two optical signals that are applied to the photomixer 114 beat on the photomixer 114 so that the photomixer 114 can then output an electrical signal at the frequency of the beat, which may be an intermediate frequency (IF). In this manner, an input RF signal may be temporarily converted to a spectrally pure optical signal for photonic upconversion or downconversion, then converted back to an RF signal, such as an IF microwave signal. That is, photonic upconversion or downconversion of RF signals is provided. All components may be placed on a photonic integrated circuit (PIC).

FIG. 1 thus illustrates a photonic system 100 for processing RF signals, where the system 100 includes: an optical source 102 configured to provide first and second optical signals 104, 106 with mutual coherence; an electro-optical modulator 108 configured to convert an input RF signal to an intermediate optical signal using the first optical signal 104; an optical filter 110 configured to controllably adjust a spectrum of the intermediate optical signal to produce an adjusted intermediate optical signal; and a photomixer 112 configured to convert the adjusted intermediate optical signal to an output RF signal using the second optical signal 106. The electro-optical modulator 108 is configured to generate sidebands on the first optical signal using the input RF signal, and the optical filter is configured to select a particular sideband to produce the adjusted intermediate optical signal. The photomixer 112 is configured to convert the adjusted intermediate optical signal to a RF signal at an Intermediate Frequency (IF) based on a frequency difference between the adjusted intermediate optical signal and the second optical signal. Note that, in other aspects, the processing performed by the photonic system may involve adjusting other characteristics of the RF input signal besides its frequency, such as adjusting power, quadrature, etc.

A major capability offered by the photonic architecture of FIG. 1 is wideband tunability, allowing the same PIC to be suitable for operation at a very large bandwidth, e.g., microwave to sub-THz and beyond, limited only by the bandwidth of the modulators and photomixer. The incorporation of the high performance tunable LO enables wideband tuning and reconfigurability, thus simplifying applications such as, for example, software-defined radio, reconfigurable receivers, and multi-band radar. This capability can be achieved, as described below, by utilizing the light from two lasers producing the high performance photonic LO as optical carriers on which signals can be modulated.

Having a dichromatic optical source (or an LO) with high spectral purity (low phase noise) is important, and the device of FIG. 1 provides high spectral purity. In this regard, it is known that two lasers separated by a fixed frequency in their emission can beat on a photodetector to produce an electrical signal at that frequency separation. This technique has been found unsuitable for high spectral purity (low noise) LO generation, since the noise of the electrical (RF) LO is related to the noise of the two lasers through the relationship $\mathscr{L}RF(f)=2\cdot\mathscr{L}laser(f)$, where $\mathscr{L}(f)$ is the single-sided spectral density of phase noise. (Here, the worst-case scenario is considered, where the noise in the two lasers is not correlated.) The relationship between the spectral purities of the two lasers and the generated RF is independent of frequency. This implies that the obtained spectral purity is fixed by the laser noise at any RF frequency (e.g., microwave, mm-wave, THz). This is a significant difference compared to how electrical LO signals are typically generated at high frequencies, starting from a good LO at low frequencies and multiplying it up. Multiplication of the LO frequency also multiplies the noise by a factor of 20 log N, where N is the multiplication factor. By contrast, a photonic technique does not add noise as the frequency interval of the two lasers is changed to generate a higher frequency. Therefore, to generate a 100 GHz signal with phase noise $\mathscr{L}RF(f)=80$ dBc/Hz at 10 kHz, the optical signal should have phase noise $\mathscr{L}laser(f)=83$ dBc/Hz at 10 kHz. The noise of a semiconductor laser may be significantly higher than this value, and so the convenience of this technique may not be accessible to at least some high performance systems.

Figure 2:
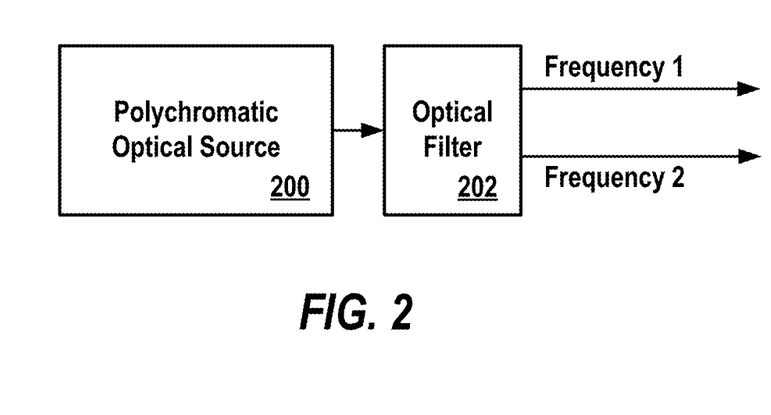
FIG. 2 illustrates the generation of a pair of optical signals using a polychromatic optical source for use in the device of FIG. 1.
Figure 3:
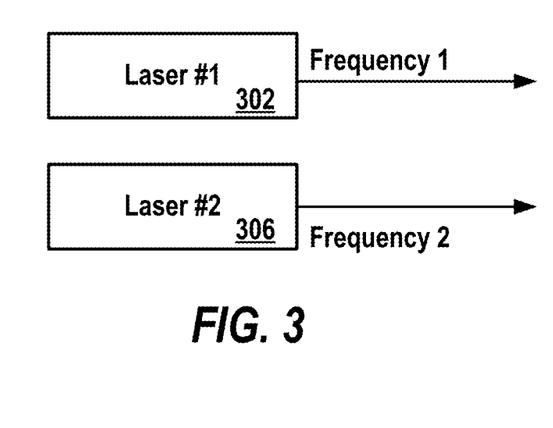
FIG. 3 illustrates the generation of a pair of optical signals using separate lasers for use in the device of FIG. 1.

For at least these reasons, a main practical requirement of the dichromatic optical source is the spectral purity (low phase noise) of the beat note of the two optical harmonics produced by the source. As shown in FIG. 2, the two harmonics can be created by a polychromatic optical source 200 (e.g., an optical frequency comb or optical signal produced by an opto-electronic oscillator), followed by an optical filter 202 that separates optical harmonics in space. As shown in FIG. 3, the two harmonics can be created instead by two independent optical sources, such as lasers 302 and 304. The two optical sources should have a high degree of correlation between their optical harmonics. Thus, FIGS. 2 and 3 illustrate two possible realizations of a dichromatic optical source: (a) a polychromatic frequency source used to produce the two optical frequencies or (b) two lasers used to produce the optical frequencies. In at least some implementations, the two-laser system may require phase locking between two lasers to reduce their relative noise.

Note that the RF photonic systems disclosed herein have both technical and fundamental differences with respect to known photonic systems.

Fundamentally, the photonic approach disclosed herein does not involve any external high frequency RF reference signals generated either electronically or photonically. Technically, the photonic systems disclosed herein do not call for a broadband high frequency photodiode and thus, by providing the desired IF frequency, reduce the need for high performance amplifier/analog-to-digital (A-to-D) converter. The high frequency RF (e.g., microwave) signal is transferred to a low frequency IF that can be amplified and digitized. Also, the system disclosed herein can be integrated on a PIC having small footprint.

Generally speaking, high frequency narrowband as well as broadband RF signals offer significant applications potential in radar measurements, data transfer with increased transmission rate and multipath tolerance in wireless communications. It is inherently difficult (and perhaps not currently possible) to process these signals directly with conventional electronics due to limits in the performance of A-to-D converter technology, amplification technology.

Among other advantages and uses, the RF photonic systems disclosed herein and related technologies, methods and devices can enhance applications of agile spectrally pure lasers, photonic oscillators, and RF photonic receiver front-ends. (Herein, by "agile," it is meant that the device can quickly shift its operating frequencies or other parameters and characteristics.)

In the following section, various exemplary embodiments of the generalized photonic devices of FIGS. 1-2 will now be described.

Figure 4:
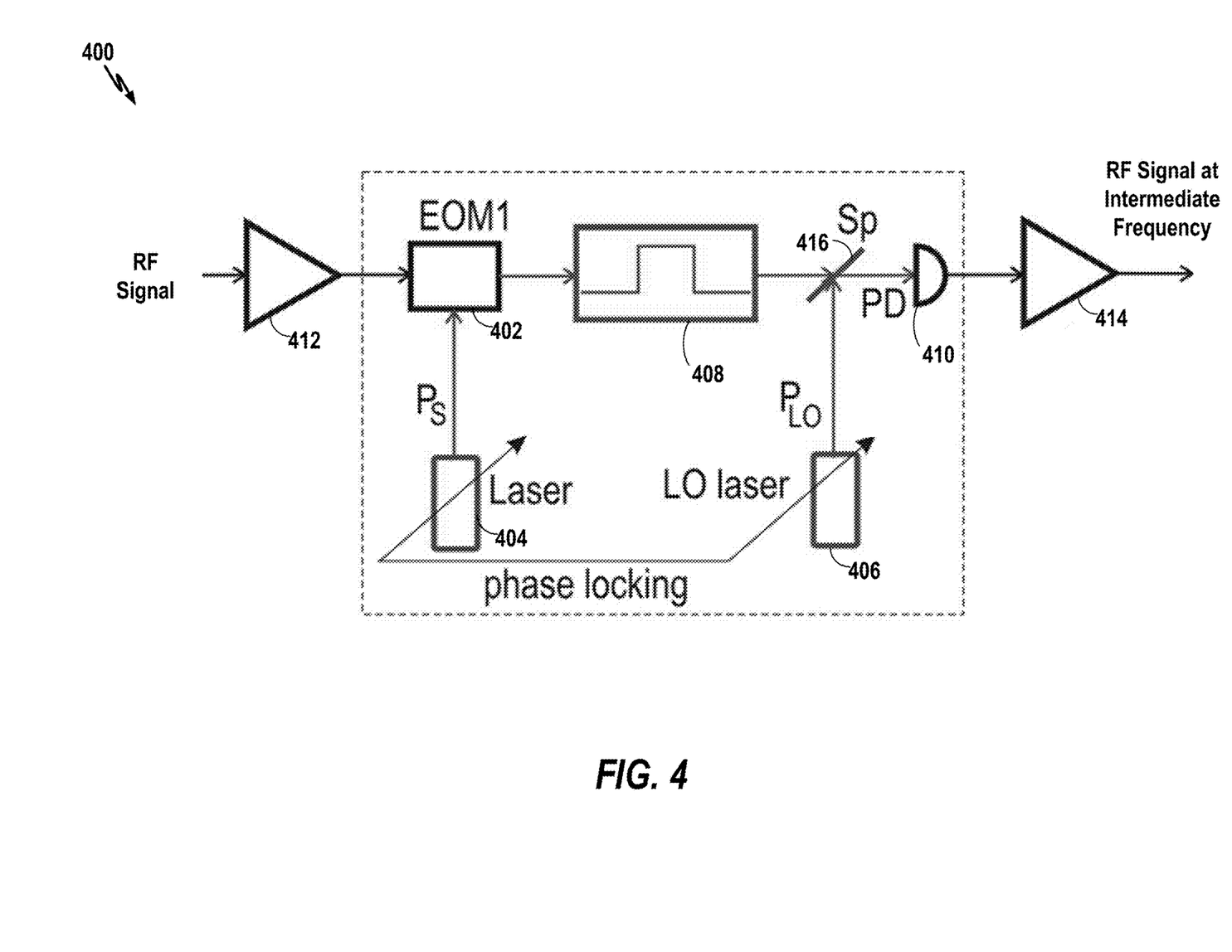
FIG. 4 illustrates a photonic device for converting an RF signal to an IF signal or baseband signal, wherein the optical source includes two phase locked lasers.

FIG. 4 illustrates a RF photonic system or device 400 realized using two phase locked lasers and provides an illustrative example of the system of FIG. 1, described above. Among other components, the RF photonic system 400 includes an EOM 402, a pair of lasers, 404 and 406, a filter 408, and a photodetector (PD), arranged as shown. A first amplifier 412 provides a RF input signal to the EOM 402 and a second amplifier 414 may amplify the output of the PD 410 to provide a RF output signal at an intermediate frequency (IF). Note that the second laser 406 functions as a local oscillator (LO) laser. The two lasers —404 and 406 are phase locked (by components not separately shown) with high mutual coherence, with laser 404 providing a first phase locked laser beam (or signal) $P_s$ that is fed into the EOM 402, and LO laser 406 providing a second phase locked laser beam (or signal) $P_{LO}$, that is fed into a beam combiner 416. The input RF signal is applied to the EOM 402 and serves to modulate the $P_s$ laser beam to thereby upconvert the RF signal to an optical signal. As already explained in connection with FIG. 1, the modulated laser beam has various sidebands. The filter 408 selects one of the sidebands and outputs an optical beam having a frequency at that sideband. The sideband beam is combined by the combiner 416, and the combined beam is applied to the PD 410 where it beats on the PD to generate an electrical signal at an IF based on the beat. The output IF signal is amplified by amplifier 414. The various components are controlled so that the output IF signal is at a desired IF. The phase locking of the two lasers helps maintain high mutual coherence so that the output IF signal can be precisely controlled and maintained.

Note that the PD 410 may be remote (or separated) from the other components (e.g., the lasers 404, 406, the EOM 402, the optical filter 408, and combiner/mixer 416. That is, the laser beam output from component 416 is a coherent beam, the laser beam may be transmitted or projected a potentially significant distance before it reaches the PD 410. (This may involve additional optical transmission/reception components not shown.) In some space-based examples, the PD 410 may be in one space-based platform or satellite, whereas the other components may be in another space-based platform or satellite, a kilometer or more away. In other examples, the PD may be located closer to the other components while still being separate therefrom (e.g. the PD may be located, e.g., 100 meters, 10 meters, 1 meter, 10 cm, or 1 cm from the other components).

Note also that the input RF signal may be a communication signal carrying data, such as a quadrature signal encoded using quadrature amplitude modulation (QAM), e.g. 8-QAM, 16-QAM, 32-QAM, 64-QAM, 128-QAM, 256-QAM, etc. In some examples, the RF photonic system is configured for backhaul data transmission within a telecommunication system, such as within the backbone of a core network or within or between edge components of a network. The above-mentioned space-based platforms or satellites may be examples of such edge components.

In some aspects, the system of FIG. 4 thus provides a system capable of processing RF signals of interest, with the system including: a) an optical source of at least two optical harmonics having high mutual coherence (e.g. the two lasers); b) an electro-optical mixer for upconverting a RF signal to optical signal; c) an optical processor configured (e.g. the filter) to controllably alter the spectrum of the optical signal; and d) an optical-to-electrical converter (e.g. the PD) producing an IF output signal.

Figure 5:
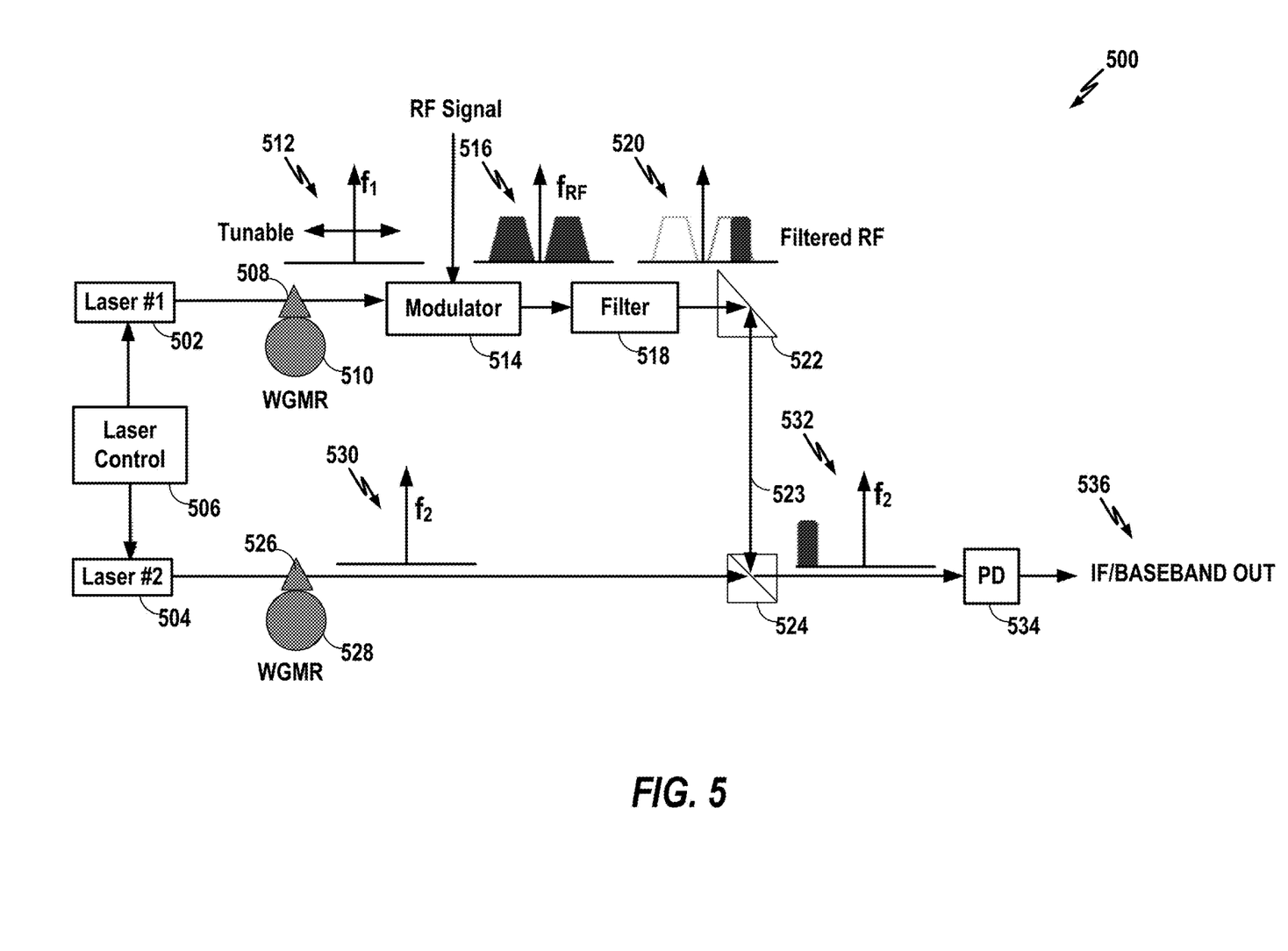
FIG. 5 illustrates another photonic device for converting an RF signal to an IF/baseband signal, wherein the optical source includes two injection-locked lasers.

FIG. 5 illustrates an exemplary device 500, which shows how a signal to be up or downconverted can be applied to one or more of the lasers. Laser #1 502 and LO laser #2 504 are controlled by a laser control component 506. A beam from laser #1 is fed through a prism 508 (or other suitable device), which couples a portion of the beam into a whispering gallery mode resonator (WGMR) 510 (e.g. a microresonator) for use in injection-locking the laser #1 at a frequency $f_1$. As shown by way of graph 512, $f_1$ is tunable. In some examples, $f_1$ is controlled via laser control 506. In other examples, $f_1$ may be tuned by adjusting the WGMR (via a control device now shown). A main portion of the tuned beam from laser #1 continues into modulator 514 (e.g., an EOM), which also receives an input RF signal at $f_{RF}$. Modulator 514 modulates the laser signal $f_1$ using $f_{RF}$ to generate sidebands around $f_{RF}$. Graph 516 shows a pair of sidebands. The modulated beam is fed into a filter 518, which is configured to select a particular sideband, as shown by way of graph 520 (with the selected sideband shown in black). The laser beam at the selected sideband is reflected by reflector 522 along optical path 523 into a combiner/mixer 524, where it is merged with a beam from laser #2 at $f_2$. In this regard, a laser beam from LO laser #2 is fed into a prism 526, which couples a portion of the beam into another WGMR 528 (e.g. another microresonator) for use in injection-locking the laser #2 at a frequency $f_2$ (shown by way of graph 530). (Although not specifically shown in the figure, in some examples, $f_2$ might be tunable as well as $f_1$.) Combiner 524 combines the beam from laser #1 at the selected sideband with the beam from laser #2 at $f_2$ to you yield a combined beam, as shown by way of graph 532. The combined beam is applied to a PD 534, where it beats to generate an output electrical signal 536 at an IF or baseband frequency. In this example, laser #2 thus operates as an LO. By selecting a particular sideband frequency (via the filter 518) and by setting $f_2$, a desired output frequency can be selected for the output signal to thereby upconvert or downconvert the input RF signal to the desired output frequency.

Thus, as shown in FIG. 5, for applications where a filtered portion of the laser #1 signal is desired, an optical filter 518 follows the modulator 514. Note that the filter 518 should have a fixed bandwidth, but the RF frequency can be set at any desired value by tuning its center frequency with respect to the center frequency of the optical filter. By tuning the frequency of laser #1, the desired portion of the RF sideband generated by the modulator 514 is made to pass through the filter 518. The output of the filter 518 is mixed with the light from the second (optical LO producing) laser (i.e., laser #2) via combiner/mixer 524, with the frequency $f_2$ of laser #2 tuned to produce an output at any desired IF, or at baseband. Note that the same architecture can be configured to obtain either upconversion or downconversion of the input RF signal by choosing the desired frequency ($f_2$) of laser #2. So the system can serve as either an up or a down-converter of frequency.

Figure 6:
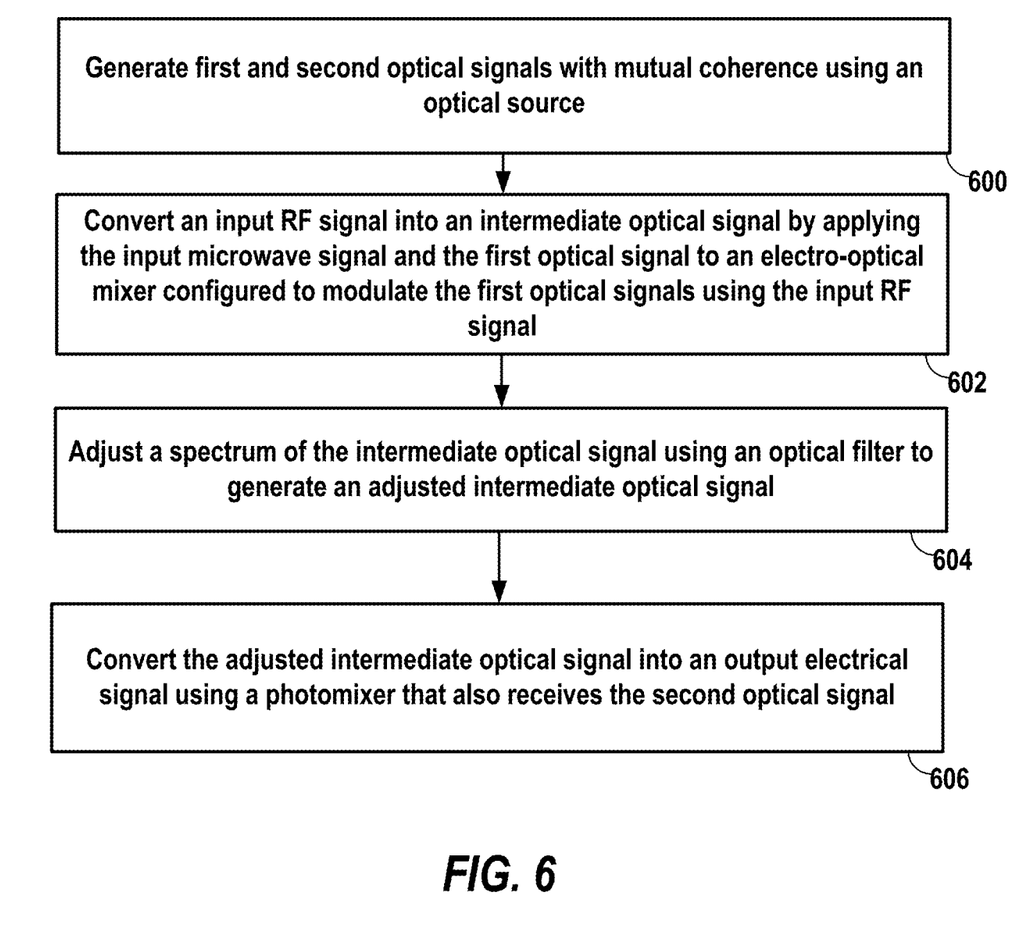
FIG. 6 is a flowchart illustrating a method for converting a RF signal to an IF signal (or other desired output signal).

FIG. 6 summarizes methods that may be performed using, e.g., the photonic devices and systems described above. Briefly, at block 600, the photonic device generates first and second optical signals with mutual coherence using an optical source. At block 602, the photonic device converts an input RF signal into an intermediate optical signal by applying the input RF signal and the first optical signal to an electro-optical mixer configured to modulate the first optical signals using the input RF signal. At block 604, the photonic device adjusts a spectrum of the intermediate optical signal using an optical filter to generate an adjusted intermediate optical signal. At block 606, the photonic device converts the adjusted intermediate optical signal into an output electrical signal using a photomixer that also receives the second optical signal. As already explained, converting the input RF signal into the intermediate optical signal may include generating sidebands on the first optical signal, and adjusting the spectrum of the intermediate optical signal may include selecting a particular sideband to produce the adjusted intermediate optical signal.

A main significance of incorporating the high performance photonic LO in the up/down frequency converter is that it can be realized on a photonic chip. All waveguides, beam splitters, and other passive components can be fabricated, for example, with silicon or silicon nitride, or other material compatible with semiconductor manufacturing processes. The laser and the detector can be flip chipped, and so can the resonators. Alternatively, resonators may be manufactured as high Q ring resonators produced lithographically, or by crystalline whispering gallery mode resonators fabricated externally and applied directly to the chip. The modulator can be of Mach-Zehnder type or ring or plasmonic variety, also manufacturable via semiconductor manufacturing processes.

What have been described thus far are exemplary photonic systems, devices, and methods for converting an input RF signal to an IF or baseband signal, which exploit high performance photonic LOs. In the following, exemplary LOs are described, which may be used in photonic systems or devices for converting an input RF signal to an IF or baseband signal, or for other purposes.

Exemplary Local Oscillators

Figure 7:
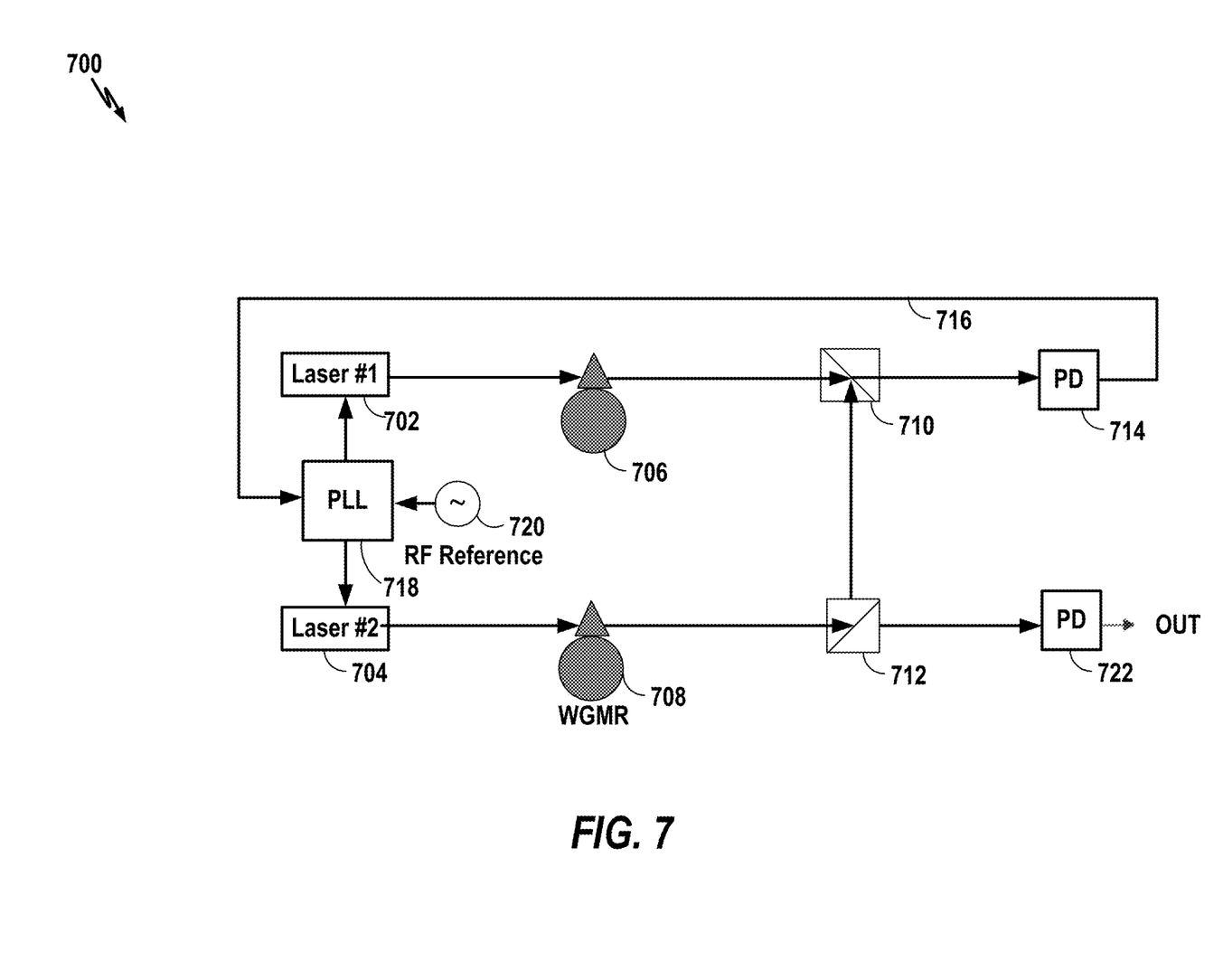
FIG. 7 illustrates a photonic local oscillator (LO), wherein the optical source includes two injection-locked lasers.

FIG. 7 illustrates a photonic LO device 800 employing injection-locked lasers, 702 and 704. Two semiconductor lasers are injection locked to high quality factor (Q) resonators, 706 and 708, which may be WGMRs. The output beam from resonators 706 is fed into a combiner/mixer 710, which also receives the output of resonator 708 via splitter 712. The combined output beam from mixer 710 is applied to a PD 714, where it beats on the PD 714 and generates an electrical signal at a frequency of the beat. That electrical signal is fed back along a feedback line 716 to a phase locked loop (PLL) 718, which controls both of the lasers, 702 and 704, based on an RF reference clock signal from a source 720. Concurrently, a portion of the beam from laser 704 passes through splitter 712 and is applied to a second PD 722 to provide a tunable LO output signal.

This architecture can significantly reduce the noise of the semiconductor lasers. In the case of ultra-high Q whispering gallery mode crystalline resonators (e.g., WGMRs), the noise of the lasers collapses by six orders of magnitude. Indeed, the system/technique can produce $\mathscr{L}RF(f)=80$ dBc/Hz at 10 kHz, and even lower noise values, at any frequency set by the difference of frequency in the two laser emissions. With this photonic architecture, LO signals at frequencies above Ku-band (i.e., the portion of the electromagnetic spectrum in the RF range of frequencies from 12 to 18 GHz) can be generated with phase noise performance unmatched by dielectric resonators (DRs) or other oscillators used in the electronic domain. Below Ku-band, these signals have performance comparable to high-end DR oscillators (DROs).

A feature of the architecture depicted in FIG. 7 is that a PLL laser control circuit can be used to tune the lasers emissions to provide the tunable LO output signal. Tuning is achieved by a combination of changing laser temperature, resonator temperature, and in cases where the resonators are made with material that is electrooptic, by applying a voltage to the resonators. The PLL laser control circuit can also be employed to allow the lasers to be locked to a reference signal, as shown, as is often useful in applications such as receivers and radar.

Figure 8:
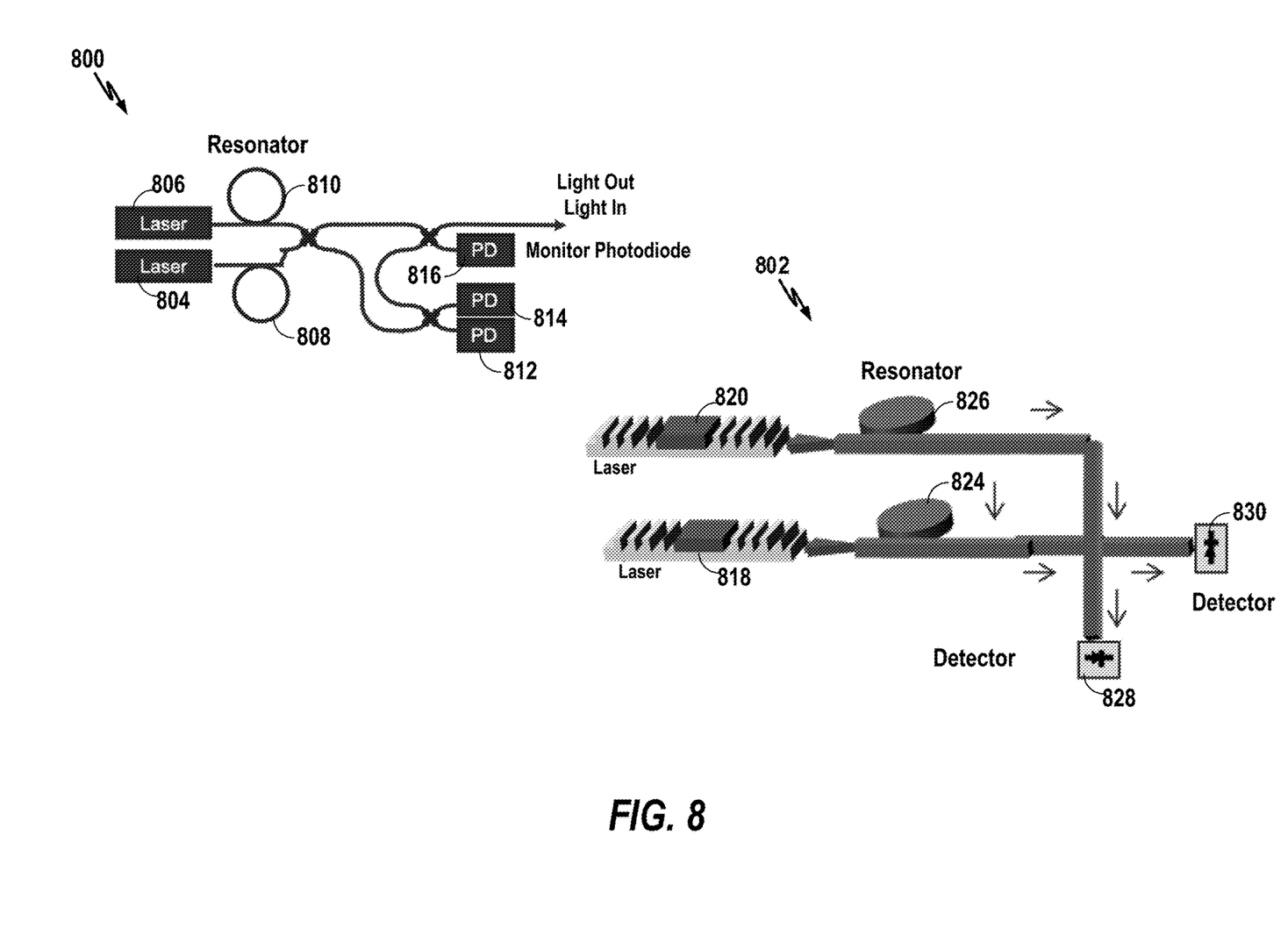
FIG. 8 provides schematic diagrams of exemplary chip layouts for photonic devices.

FIG. 8 provides schematic diagrams 800 and 802 of exemplary chip layouts for components of an LO. Chip layout 800 includes a pair of semiconductor lasers 804 and 806, a pair of resonators, 808 and 810, and a pair photodetectors 812 and 814, connected as shown by various optical waveguides that are interconnected via various optical combiner/mixers. A third PD 816 may be used as a monitor PD. Note that the PDs may be located off chip and, in some examples, the laser may be located off chip as well. Chip layout 802 also includes a pair of lasers 818 and 820, a pair of resonators, 824 and 826, and a pair photodetectors 828, and 830, connected as shown by various optical waveguides that are interconnected via various optical combiner/mixers. Again, the PDs and lasers may be located off chip. Although not shown, electrical signal lines may be connected to the various PDs to obtain output electrical signals that may be used to control other devices or may be used as feedback to one or both of the lasers. Note that the output optical waveguide of layout 800 may also receive an input optical signal, and hence is labeled Light Out/Light In. Phase lock loop components (not shown) may be employed in either of the layouts to control the lasers, as shown in FIG. 7.

ADDITIONAL ASPECTS AND CONSIDERATIONS

Note that one or more of the components, steps, features, and/or functions illustrated in FIGS. 1, 2, 3, 4, 5, 6, 7, and 8 may be rearranged and/or combined into a single component, step, feature or function or embodied in several components, steps, or functions. Additional elements, components, steps, and/or functions may also be added without departing from the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, an aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

The term "coupled" may mean that two or more elements are in direct physical or electrical contact. However, "coupled" may also mean that two or more elements are not in direct contact with each other, but yet still co-operate or interact with each other.

Not all components, features, structures, characteristics, etc. described and illustrated herein need be included in a particular aspect or aspects. If the specification states a component, feature, structure, or characteristic "may," "might," "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although some aspects have been described in reference to particular implementations, other implementations are possible. Additionally, the arrangement and/or order of elements or other features illustrated in the drawings and/or described herein need not be arranged in the particular way illustrated and described. Many other arrangements are possible according to some aspects.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A photonic system comprising:
   a tunable dichromatic optical source configured to provide first and second optical signals with mutual coherence;
   an electro-optical modulator configured to convert an input radio-frequency (RF) signal to an intermediate optical signal using the first optical signal;
   an optical filter configured to controllably adjust a spectrum of the intermediate optical signal to produce an adjusted intermediate optical signal; and
   a photomixer configured to convert the adjusted intermediate optical signal to an output electrical signal using the second optical signal.

2. The photonic system of claim 1, wherein the electro-optical modulator is configured to generate sidebands on the first optical signal using the input RF signal, and wherein the optical filter is configured to select a particular sideband to produce the adjusted intermediate optical signal.

3. The photonic system of claim 1, wherein the electro-optical modulator comprises a plasmonic electro-optical modulator or an electro-optic parametric converter.

4. The photonic system of claim 1, wherein the optical filter comprises a frequency selective phase shifter or a frequency selective delay line.

5. The photonic system of claim 1, wherein the photomixer comprises a photodiode, a nonlinear electro-optical crystalline converter, or a plasmonic converter.

6. The photonic system of claim 1, wherein the photomixer is configured to convert the adjusted intermediate optical signal at its output to an electrical signal at an Intermediate Frequency (IF) based on a frequency difference between the adjusted intermediate optical signal and the second optical signal.

7. The photonic system of claim 1, wherein all or a portion of the photonic system is configured as a photonic integrated circuit (PIC).

8. The photonic system of claim 1, wherein the photomixer is at least one meter from the optical source, the electro-optical modulator, and the optical filter.

9. The photonic system of claim 8, wherein the input RF signal is a microwave signal or a millimeter (mm) wave signal.

10. The photonic system of claim 1, wherein the input RF signal is communication signal carrying data.

11. The photonic system of claim 10, wherein the photonic system is configured for backhaul data transmission.

12. A method for processing signals using a photonic device, the method comprising:
   generating first and second coherent optical signals using a tunable dichromatic optical source;
   converting an input radio-frequency (RF) signal into an intermediate optical signal by applying the input RF signal and the first optical signal to an electro-optical mixer configured to modulate the first optical signals using the input RF signal;
   adjusting a spectrum of the intermediate optical signal using an optical filter to generate an adjusted intermediate optical signal; and
   converting the adjusted intermediate optical signal into an output electrical signal using a photomixer that also receives the second optical signal.

13. The method of claim 12, wherein converting the input RF signal into the intermediate optical signal includes generating sidebands on the first optical signal, and wherein adjusting the spectrum of the intermediate optical signal includes selecting a particular sideband to produce the adjusted intermediate optical signal.

* * * * *